US012794334B2

(12) United States Patent
Perreault et al.

(10) Patent No.: US 12,794,334 B2
(45) Date of Patent: Nov. 10, 2026

(54) SYSTEM AND METHOD FOR ELECTROMAGNETIC PINNING AND HYBRID CONTROL OF A LINEAR DRIVE SYSTEM

(71) Applicant: Rockwell Automation Technologies, Inc., Mayfield Heights, OH (US)

(72) Inventors: Brian M. Perreault, Stow, MA (US); Yuhong Huang, Acton, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 147 days.

(21) Appl. No.: 18/967,110

(22) Filed: Dec. 3, 2024

(65) Prior Publication Data

US 2025/0096663 A1 Mar. 20, 2025

Related U.S. Application Data

(63) Continuation of application No. 17/810,156, filed on Jun. 30, 2022, now Pat. No. 12,176,783.

(51) Int. Cl.

| | |
|---|---|
| ***H02K 41/02*** | (2006.01) |
| ***B65G 43/00*** | (2006.01) |
| ***B65G 43/08*** | (2006.01) |
| ***B65G 54/02*** | (2006.01) |
| ***H02K 41/03*** | (2006.01) |

(52) U.S. Cl.

CPC ............. *H02K 41/02* (2013.01); *B65G 43/00* (2013.01); *B65G 43/08* (2013.01); *B65G 54/02* (2013.01); *H02K 41/033* (2013.01); *H02K 41/031* (2013.01)

(58) Field of Classification Search

CPC .... H02K 41/02; H02K 41/031; H02K 41/033; B65G 54/02; B65G 43/08

USPC .......................................................... 198/805

See application file for complete search history.

(56) References Cited

U.S. PATENT DOCUMENTS

| | | | | |
|---|---|---|---|---|
| 9,365,354 | B2 | 6/2016 | Takagi | |
| 10,012,977 | B2 * | 7/2018 | Ono | G05B 19/416 |
| 10,910,979 | B2 * | 2/2021 | Kaidu | H02P 25/04 |
| 12,176,783 | B2 * | 12/2024 | Perreault | H02P 25/064 |
| 2011/0043159 | A1 | 2/2011 | Shoda et al. | |
| 2015/0303841 | A1 | 10/2015 | Suzuki et al. | |

(Continued)

FOREIGN PATENT DOCUMENTS

| | | | | |
|---|---|---|---|---|
| CN | 110138282 B * | 9/2020 | | H02P 5/74 |
| JP | 4688022 B2 | 5/2011 | | |

(Continued)

OTHER PUBLICATIONS

Extended European Search Report for Application No. 23180277.8 dated Nov. 2, 2023 (27 pages).

*Primary Examiner* — James R Bidwell

(74) *Attorney, Agent, or Firm* — Boyle Fredrickson, S.C.

(57) ABSTRACT

A system and method for holding position of a mover in an independent cart system includes receiving a current feedback signal corresponding to a current present in at least one coil for a linear drive system in the independent cart system. A motion command for the mover is received, where the motion command defines a desired position along a track of the independent cart system to which the mover is to travel. An electromagnetic pinning control mode is disabled while controlling operation of the at least one mover to the desired position and enabled when the at least one mover is at the desired position.

20 Claims, 11 Drawing Sheets

(56) References Cited

U.S. PATENT DOCUMENTS

2019/0092578 A1 3/2019 Umeyama et al.
2019/0097552 A1 * 3/2019 Das .......................... H02P 6/006
2020/0171958 A1 6/2020 Huang
2024/0230375 A1 * 7/2024 Huang ...................... G01D 5/14

FOREIGN PATENT DOCUMENTS

WO 2012127687 A1 9/2012
WO WO-2019007199 A1 * 1/2019 ............. H02K 11/21

* cited by examiner

SYSTEM AND METHOD FOR ELECTROMAGNETIC PINNING AND HYBRID CONTROL OF A LINEAR DRIVE SYSTEM

CROSS-REFERENCE TO RELATED APPLICATIONS

This application is a continuation of and claims priority to U.S. application Ser. No. 17/810,156, filed Jun. 30, 2022, the entire contents of which is incorporated herein by reference.

BACKGROUND INFORMATION

The subject matter disclosed herein relates to maintaining position of a stopped vehicle in a linear drive system and, more specifically, to regulating flux and torque producing components of current with a stator of a linear drive system to resist movement of a stopped vehicle resulting from external disturbances experienced by the vehicle.

Motion control systems utilizing carts and linear drives in an independent cart system can be used in a wide variety of processes (e.g. packaging, manufacturing, and machining) and can provide an advantage over conventional conveyor belt systems with enhanced flexibility, extremely high-speed movement, and mechanical simplicity. The motion control system includes a set of independently controlled carts, also referred to herein as vehicles or "movers," each supported on a track for motion along the track. The track is made up of a number of track segments that, in turn, hold individually controllable electric coils. Successive activation of the coils establishes a moving electromagnetic field that interacts with the movers and causes the mover to travel along the track.

Each of the movers may be independently moved and positioned along the track in response to the moving electromagnetic field generated by the coils. In a typical system, the track forms a path over which each mover repeatedly travels. At certain positions along the track other actuators may interact with each mover. For example, the mover may be stopped at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then completes a cycle along the path by returning to the loading station to receive another unit of the product.

When a mover stops at one of the stations for interaction with an external actuator, the mover may experience disturbance forces from the external actuator. The external actuator may, for example, affix a label to a product on the mover, fill a container located on the mover, or perform a machining function to a part loaded on the mover. Each action applies some force to the product which, in turn, translates a force to the mover. In other applications, the track on which the mover is locate may be oriented on a slope or even vertically such that the mover experiences a force due to gravity. In some applications, the force experienced by the mover may be sufficient to cause motion of the mover, pushing the mover out of position from the station. Some action must be taken to prevent undesired motion of the mover away from the station.

Historically, one method of retaining a mover in position is to provide a mechanical structure that locks the mover in place. The mechanical structure may be a pin configured to extend and retract from the track. When the mover arrives at a station, the pin may be extended into a cavity on the mover to positively retain the mover in position. An action is performed by the external actuator, and the pin is then retracted back into the track in order to allow the mover to resume travel. Similarly, a mechanical linkage from the actuator, such as a fill tube or the like may attach to a product mounted on the mover prior to filling a container. The mechanical linkage may be configured to retain the mover in position as product is being filled in a container to which the linkage is coupled. A mechanical structure to lock the mover in place increases the complexity and cost of the track and/or the interaction of the external actuator with the mover. Waiting for a mechanical structure to engage with and disengage from a mover reduces the throughput of the system. Further, the mechanical structure will experience wear and require maintenance, increasing maintenance costs for the system.

Another method of retaining a mover in position is to utilize the same motor control routine used to position the mover to maintain position of the mover when the mover is located at a station. The motor control typically works based on a position reference to drive each mover to a desired position. When the motor control is attempting to maintain position, a constant position, also referred to as a zero speed command, is provided to the motor control, and the motor control will attempt to keep the mover at the desired position. If the motor control remains active, however, it typically cannot be used in conjunction with a mechanical structure. A pin extending into the mover may cause the mover to move by a slight distance during coupling. With a constant position commanded, the motor control will resist such motion and attempt to return to the original position before the pin was extended. If the mover is moved out of position by the pin, the motor control may build up excessive current attempting to return to position, driving against the pin. The excessive current can cause overheating of the motor coils, damage to the pin or mover, or otherwise damage the linear drive system. Thus, keeping the motor control active must be done independently of a mechanical coupling.

Attempting to maintain position at a station with the constant position command has other drawbacks as well. Electronic noise on a position feedback signal appears as movement to a controller even if the mover itself has not moved. The controller will attempt to compensate for variations in a position feedback signal due to noise resulting in some movement or vibration of the mover about the desired position. Certain applications, however, may require very precise positioning. For example, a mover may be required to stay within a few microns of the position at which it stopped. The movement or vibration resulting from noise on the position feedback signal may exceed the precise positioning tolerances required.

Even if there isn't electrical noise on the position feedback signal, position drift may occur. A position feedback signal may have some offset value and/or change value over time due, for example, to variation in ambient temperature or other operating conditions. Many motor controllers will utilize an integral term to reduce tracking error to zero. However, if there is some offset or other variation in the position feedback signal over time, the integral term will interpret the offset as an error value and attempt to compensate for that offset value. It is known that certain position feedback signals may experience offset, or position drift, of plus or minus twenty microns over time. The motor controller will attempt to correct for the measured position drift even though the mover has not moved, resulting in the mover traveling away from the desired position. Existing measurement systems and existing motor control routines are often insufficient to maintain tight position tolerances when experiencing electronic noise or position drift on position feedback signals.

Thus, it would be desirable to provide an improved control system to hold a mover at a desired position in a linear drive system without requiring a mechanical coupling.

BRIEF DESCRIPTION

According to one embodiment of the invention, a method for holding position of a mover in an independent cart system includes receiving a current feedback signal at a controller for the independent cart system in a physical reference frame, where the current feedback signal corresponds to a current present in at least one coil for a linear drive system in the independent cart system. A current reference for the at least one coil is generated in a first operating mode with the controller to drive at least one mover to a desired position along a track in the independent cart system and in a second operating mode to hold the at least one mover at the desired position along the track in the independent cart system.

According to another embodiment of the invention, a system for holding position of a mover in an independent cart system includes a track having a first drive member of a linear drive system, at least one mover having a second drive member of the linear drive system, and a controller. The first drive member and the second drive member operatively engage each other to drive the at least one mover along the track. The controller is configured to execute a series of instructions to regulate a current present in the first drive member in a first operating mode to drive the at least one mover to a desired position along the track and to regulate the current present in the first drive member in a second operating mode to hold the at least one mover at the desired position.

According to still another embodiment of the invention, a non-transitory computer-readable storage medium stores instructions for execution by a processor. When executed, the instructions comprise the steps of receiving a current feedback signal corresponding to a current present in at least one coil for a linear drive system in an independent cart system, receiving a motion command for at least one mover to travel to a desired position along a track of the independent cart system, disabling an electromagnetic pinning control mode while controlling operation of the at least one mover to the desired position, and enabling the electromagnetic pinning control mode when the at least one mover is at the desired position.

According to yet another embodiment of the invention, a method for holding position of a mover in an independent cart system includes receiving a current feedback signal at a controller for the independent cart system in a physical reference frame. The current feedback signal corresponds to a current present in at least one coil for a linear drive system in the independent cart system. A desired current for the at least one coil is regulated with a current regulator in a first operating mode with the controller to drive at least one mover to a desired position along a track in the independent cart system and in a second operating mode with the controller to hold the at least one mover at the desired position along the track in the independent cart system. Regulating the desired current in the first operating mode includes executing an integral regulator path in the current regulator to continually adapt the desired current as the at least one mover is driven to the desired position, and regulating the desired current in the second operating mode includes executing the integral regulator path in the current regulator to maintain a constant value from the integral regulator path when the at least one mover is at the desired position.

According to still another embodiment of the invention, a system for holding position of a mover in an independent cart system includes a track, at least one mover, and a controller. The track has a first drive member of a linear drive system, and the at least one mover has a second drive member of the linear drive system. The first drive member and the second drive member operatively engage each other to drive the at least one mover along the track. The controller is configured to execute a series of instructions to regulate a desired current for the first drive member in a first operating mode to drive the at least one mover to a desired position along the track and to regulate the desired current for the first drive member in a second operating mode to hold the at least one mover at the desired position along the track. Regulating the desired current in the first operating mode includes executing an integral regulator path in a current regulator to continually adapt the desired current as the at least one mover is driven to the desired position, and regulating the desired current in the second operating mode includes executing the integral regulator path in the current regulator to maintain a constant value from the integral regulator path when the at least one mover is at the desired position.

According to another embodiment of the invention, a non-transitory computer-readable storage medium stores instructions for execution by a processor that, when executed, receive a current feedback signal corresponding to a current present in at least one coil for a linear drive system in an independent cart system and receive a motion command for at least one mover to travel to a desired position along a track of the independent cart system. A desired current is regulated for the at least one coil with a current regulator in a first operating mode to drive at least one mover to the desired position and in a second operating mode to hold the at least one mover at the desired position. Regulating the desired current in the first operating mode includes executing an integral regulator path in the current regulator to continually adapt the desired current as the at least one mover is driven to the desired position, and regulating the desired current in the second operating mode includes executing the integral regulator path in the current regulator to maintain a constant value from the integral regulator path when the at least one mover is at the desired position.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
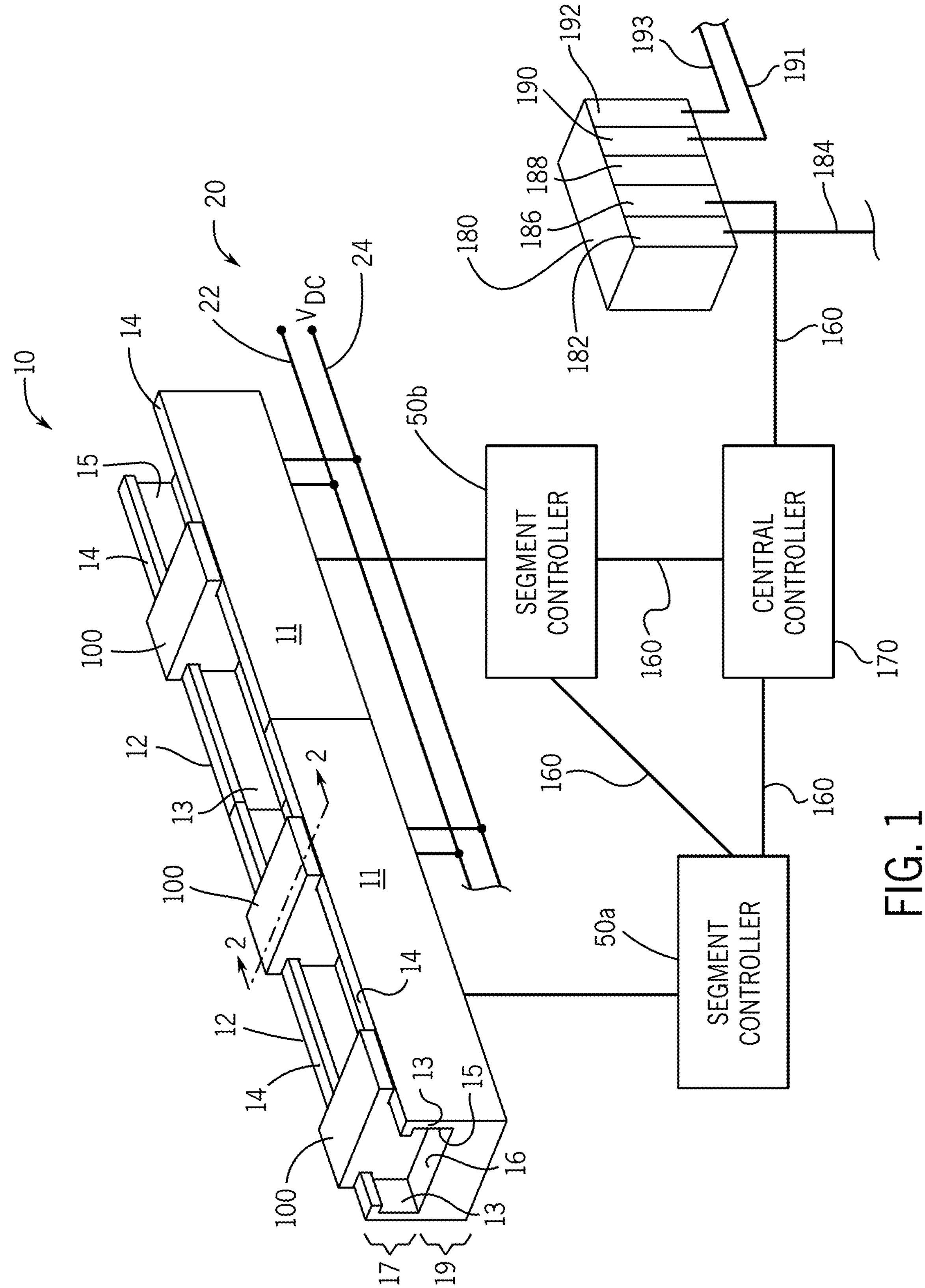
FIG. 1 is a schematic representation of an exemplary control system for a linear drive system according to one embodiment of the invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

The subject matter disclosed herein describes an improved control system to hold a mover at a desired position in a linear drive system without requiring a mechanical coupling. The motor controller utilizes what is referred to herein as an electromagnetic pinning process to maintain a desired position. The motor controller will operate in a first control mode in order to move each mover to the desired position and in a second control mode to achieve the electromagnetic pinning and hold the mover at the desired position.

In the linear drive system, coils are provided along a length of track as a first drive member, and permanent magnets are mounted on each mover as a second drive member. It is contemplated that some applications may include permanent magnets mounted along the length of the track as the first drive member and coils mounted to each mover as the second drive member. The principles discussed herein are equally applicable to the second embodiment. However, for case of discussion, the linear drive system will be discussed with respect to coils provided along the track and permanent magnets mounted on each mover.

According to one aspect of the invention, the electromagnetic pinning utilizes a flux component of current to provide additional holding force on the mover when it is located at the desired position. Current sensors are provided to measure the current in each coil along the track. The current sensors generate a current feedback signal in a physical reference frame which are provided to a controller. The controller converts the current feedback signals from a physical reference frame to a two-phase reference frame, such as the d-q reference frame. In the d-q reference frame, a first force producing, or q-axis current, corresponds to a force applied parallel to the track to propel a mover along the track, and a second force producing, or d-axis current, corresponds to a force applied perpendicular to the track, providing an attractive or repelling force between the coils and the mover. When the mover is being driven along the track, the motor controller generates a suitable first force producing, or q-axis current, to drive the mover at a desired speed. The motor controller also regulates the second force producing, or d-axis current, to zero or near zero to minimize attractive or repulsive forces between the track and the mover. When the mover is being held at a desired position, the motor controller generates a suitable first force producing, or q-axis current, to overcome physical characteristics of the track, such as cogging forces or gravitational forces, to hold the mover at its present location. The motor controller also regulates the second force producing, or d-axis current, to a desired value to provide an attractive force between the track and the mover. This attractive force is initially provided at the position at which the mover is to be held and provides a restoring force that resists movement from external forces applied to the mover. The position of the d-axis current is held constant at the desired position at which the mover is to be held. During normal operation, the d and q axis currents follow the position of the mover. Therefore, if an external force begins to displace the mover from the desired position and the applied d-axis current is held at a constant position, the second force experienced by the mover begins to transition from a d-axis current to a q-axis current, providing a restoring force opposite the direction in which the mover is displaced. In addition, because the d-axis current is being held at a constant position, the attractive force is immune to noise and/or drift in the position feedback signal eliminating the vibration that may be generated from a traditional constant position command.

Turning initially to FIGS. 1-4, an exemplary transport system for moving articles or products includes a track 10 made up of multiple segments 12. According to the illustrated embodiment, multiple segments 12 are joined end-to-end to define the overall track configuration. The illustrated segments 12 are both straight segments having generally the same length. It is understood that track segments of various sizes, lengths, and shapes may be connected together to form the track 10 without deviating from the scope of the invention. In some applications, track segments 12 may be joined to form a generally closed loop supporting a set of movers 100 movable along the track 10. The track 10 is illustrated in a horizontal plane. For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes and various combinations thereof. The track may additionally include merging and diverging segments to either combine multiple paths into a single path or split a path into multiple paths, respectively. The width of the track 10 may be greater in either the horizontal or vertical direction according to application requirements. The movers 100 will travel along the track and take various orientations according to the configuration of the track 10 and the relationships discussed herein may vary accordingly.

According to the illustrated embodiment, each track segment 12 includes an upper portion 17 and a lower portion 19. The upper portion 17 is configured to carry the movers 100 and the lower portion 19 is configured to house the control elements. As illustrated, the upper portion 17 includes a generally u-shaped channel 15 extending longitudinally along the upper portion 17 of each segment. The channel 15 includes a bottom surface 16 and a pair of side walls 13, where each side wall 13 includes a rail 14 extending along an upper edge of the side wall 13. The bottom surface 16, side walls 13, and rails 14 extend longitudinally along the track segment 12 and define a guideway along which the movers 100 travel. According to one embodiment, the surfaces of the channel 15 (i.e., the bottom surface 16, side walls 13 and rails 14) are planar surfaces made of a low friction material along which movers 100 may slide. The contacting surfaces of the movers 100 may also be planar and made of a low friction material. It is contemplated that the surface may be, for example, nylon, Teflon®, aluminum, stainless steel and the like. Optionally, the hardness of the surfaces on the track segment 12 are greater than the contacting surface of the movers 100 such that the contacting surfaces of the movers 100 wear faster than the surface of the track segment 12. It is further contemplated that the contacting surfaces of the movers 100 may be removably mounted to the housing of the mover 100 such that they may be replaced if the wear exceeds a predefined amount. According to still other embodiments, the movers 100 may include low-friction rollers to engage the surfaces of the track segment 12. Optionally, the surfaces of the channel 15 may include different cross-sectional forms with the mover 100 including complementary sectional forms. Various other combinations of shapes and construction of the track segment 12 and mover 100 may be utilized without deviating from the scope of the invention.

According to the illustrated embodiment, each mover 100 is configured to slide along the channel 15 as it is propelled by a linear drive system. The mover 100 includes a body 102 configured to fit within the channel 15. The body 102 includes a lower surface 106, configured to engage the bottom surface 16 of the channel, and side surfaces 108 configured to engage the side walls 13 of the channel. The mover 100 further includes a shoulder 105 extending inward from each of the side surfaces 108. The shoulder 105 has a width equal to or greater than the width of the rail 14 protruding into the channel. A neck of the mover then extends upward to a top surface 104 of the body 102. The neck extends for the thickness of the rails such that the top surface 104 of the body 102 is generally parallel with the upper surface of each rail 14. The mover 100 further includes a platform 110 secured to the top surface 104 of the body 102. According to the illustrated embodiment, the platform 110 is generally square and the width of the platform 110 is greater than the width between the rails 14. The lower surface of the platform 110, an outer surface of the neck, and an upper surface of the shoulder 105 define a channel 115 in which the rail 14 runs. The channel 115 serves as a guide to direct the mover 100 along the track. It is contemplated that platforms or attachments of various shapes may be secured to the top surface 104 of the body 102. Further, various workpieces, clips, fixtures, and the like may be mounted on the top of each platform 110 for engagement with a product to be carried along the track by the mover 100. The platform 110 and any workpiece, clip, fixture, or other attachment present on the platform may define, at least in part, a load present on the mover 100.

The mover 100 is carried along the track 10 by a linear drive system. The linear drive system is incorporated in part on each mover 100 and in part within each track segment 12. According to the illustrated embodiment, drive coils 150 are positioned along the length of each track segment, and one or more drive members 120 are mounted to each mover 100. It is contemplated that the drive members may be drive magnets, steel back iron and teeth, conductors, or any other suitable member that will interact with the electromagnetic fields generated by the coils 150 to propel each mover 100 along the track 10. For convenience, each drive member 120 will be discussed herein as a drive magnet. Alternately, it is contemplated that drive members 120 may be mounted along the length of each track segment and one or more drive coils 150 may be mounted to each mover 100 with the associated controllers to regulate current flow in each drive coil also mounted to each mover.

Figure 3:
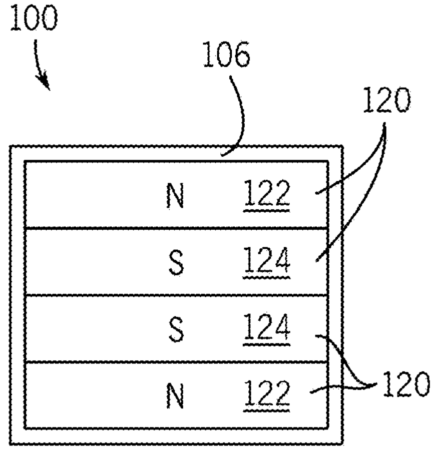
FIG. 3 is a bottom plan view of the exemplary mover of FIG. 2.
Figure 4:
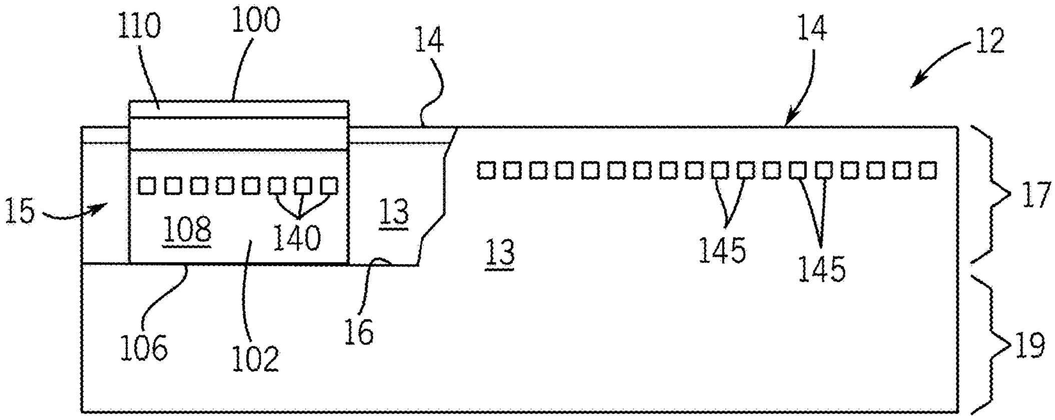
FIG. 4 is a partial side cutaway view of the mover and track segment of FIG. 2.

With reference to FIG. 3, the drive magnets 120 are arranged in a block on the lower surface of each mover. The drive magnets 120 include positive magnet segments 122, having a north pole, N, facing outward from the mover and negative magnet segments 124, having a south pole, S, facing outward from the mover. According to the illustrated embodiment, two positive magnet segments 122 are located on the outer sides of the set of magnets and two negative magnet segments 124 are located between the two positive magnet segments 122. Optionally, the positive and negative motor segments may be placed in an alternating configuration. In still other embodiments, a single negative magnet segment 124 may be located between the positive magnet segments 122. According to still another embodiment, the drive magnets 120 may utilize a Halbach array of magnets. The Halbach array inserts magnets rotated ninety degrees such that the north and south polarity of the rotated magnets appears as "east" or "west" to the other magnets. The effect of the rotation is to enhance the strength of the magnetic field along one side of the magnet array (i.e., the side facing the drive coils) and to reduce the strength of the magnetic field along the other side of the magnet array (i.e., the side facing away from the drive coils). Various other configurations of the drive magnets 120 may be utilized without deviating from the scope of the invention.

Figure 5:
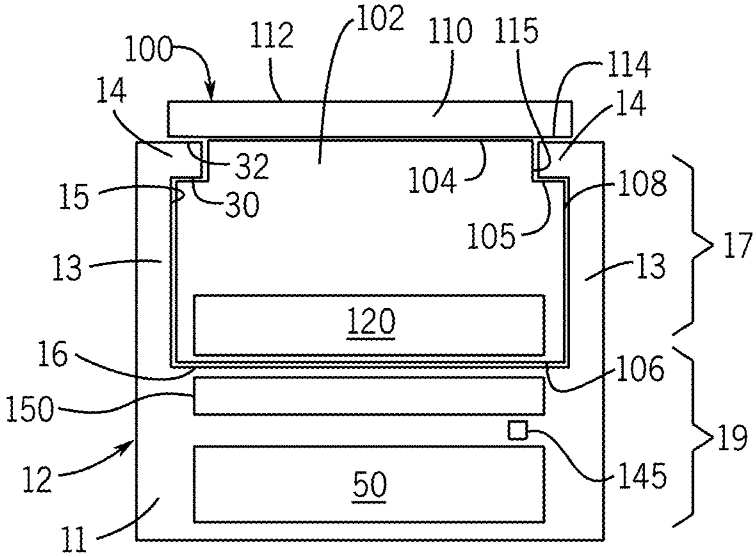
FIG. 5 is a sectional view of another embodiment of a mover and track segment included in the linear drive system taken at 2-2 of FIG. 1.
Figure 7:
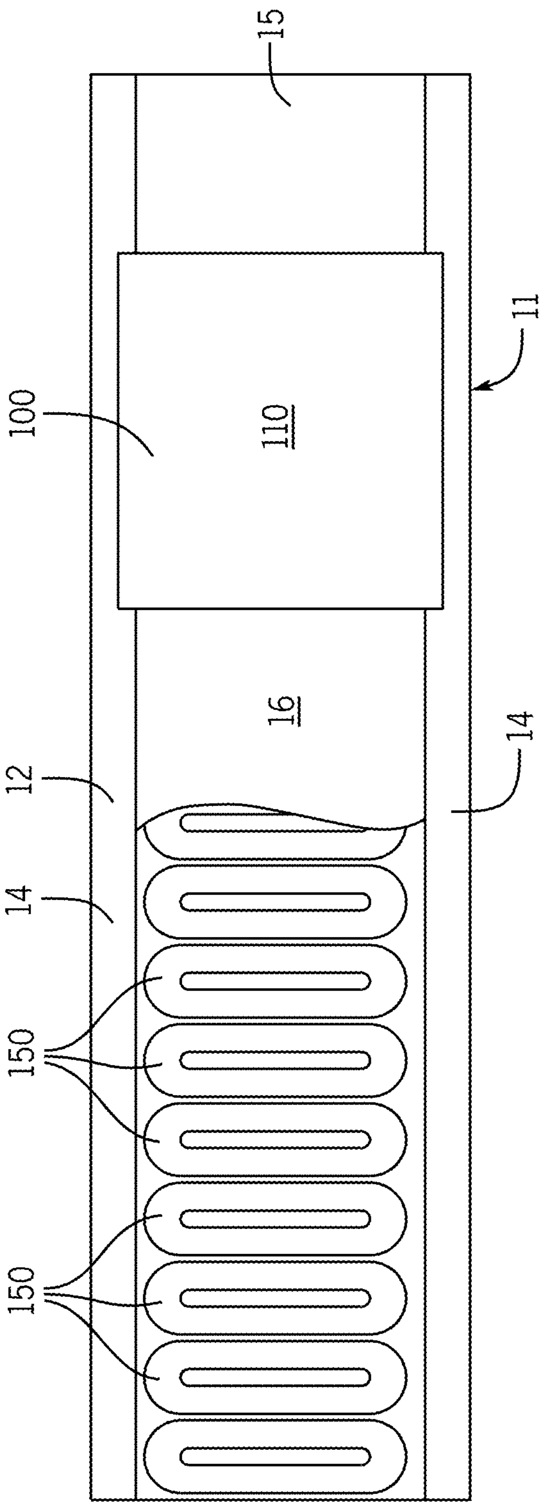
FIG. 7 is a partial top cutaway view of the mover and track segment of FIG. 2.

The linear drive system further includes a series of coils 150 spaced along the length of the track segment 12. With reference also to FIGS. 5 and 7, the coils 150 may be positioned within a housing 11 for the track segment 12 and below the bottom surface 16 of the channel 15. The coils 150 are energized sequentially according to the configuration of the drive magnets 120 present on the movers 100. The sequential energization of the coils 150 generates a moving electromagnetic field that interacts with the magnetic field of the drive magnets 120 to propel each mover 100 along the track segment 12.

Figure 2:
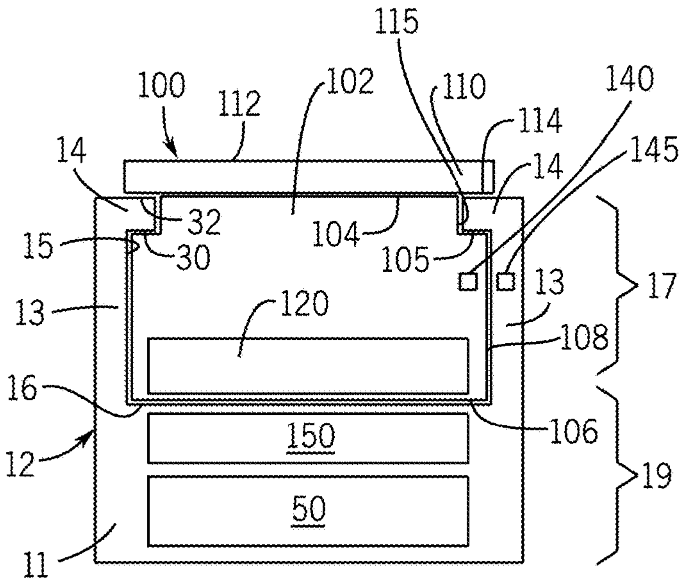
FIG. 2 is a sectional view of one embodiment of a mover and track segment included in the linear drive system taken at 2-2 of FIG. 1.

A segment controller 50 is provided within each track segment 12 to control the linear drive system and to achieve the desired motion of each mover 100 along the track segment 12. Although illustrated in FIG. 1 as blocks external to the track segments 12, the arrangement is to facilitate illustration of interconnects between controllers. As shown in FIG. 2, it is contemplated that each segment controller 50 may be mounted in the lower portion 19 of the track segment 12. Each segment controller 50 is in communication with a central controller 170 which is, in turn, in communication with an industrial controller 180. The industrial controller may be, for example, a programmable logic controller (PLC) configured to control elements of a process line stationed along the track 10. The process line may be configured, for example, to fill and label boxes, bottles, or other containers loaded onto or held by the movers 100 as they travel along the line. In other embodiments, robotic assembly stations may perform various assembly and/or machining tasks on workpieces carried along by the movers 100. The exemplary industrial controller 180 includes: a power supply 182 with a power cable 184 connected, for example, to a utility power supply; a communication module 186 connected by a network medium 160 to the central controller 170; a processor module 188; an input module 190 receiving input signals 192 from sensors or other devices along the process line; and an output module 192 transmitting control signals 193 to controlled devices, actuators, and the like along the process line. The processor module 188 may identify when a mover 100 is required at a particular location and may monitor sensors, such as proximity sensors, position switches, or the like to verify that the mover 100 is at a desired location. The processor module 188 transmits the desired locations of each mover 100 to a central controller 170 where the central controller 170 operates to generate commands for each segment controller 50.

Figure 8:
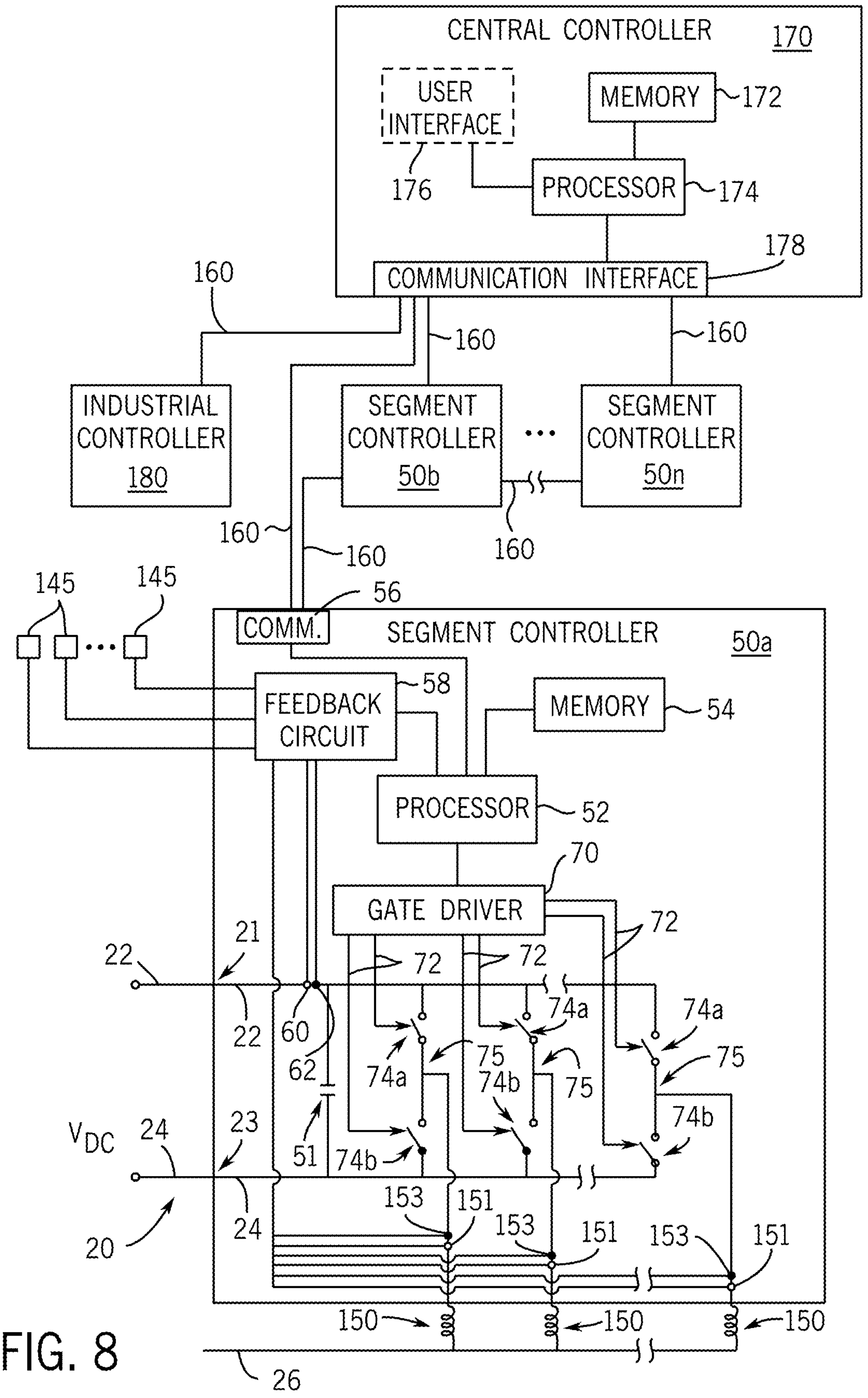
FIG. 8 is a block diagram representation of one embodiment of the exemplary control system of FIG. 1.

With reference also to FIG. 8, the central controller 170 includes a processor 174 and a memory device 172. It is contemplated that the processor 174 and memory device 172 may each be a single electronic device or formed from multiple devices. The processor 174 may be a microprocessor. Optionally, the processor 174 and/or the memory device 172 may be integrated on a field programmable gate array (FPGA) or an application specific integrated circuit (ASIC). The memory device 172 may include volatile memory, non-volatile memory, or a combination thereof. An optional user interface 176 may be provided for an operator to configure the central controller 170 and to load or configure desired motion profiles for the movers 100 on the central controller 170. Optionally, the configuration may be performed via a remote device connected via a network and a communication interface 178 to the central controller 170. It is contemplated that the central controller 170 and user interface 176 may be a single device, such as a laptop, notebook, tablet or other mobile computing device. Optionally, the user interface 176 may include one or more separate devices such as a keyboard, mouse, display, touchscreen, interface port, removable storage medium or medium reader and the like for receiving information from and displaying information to a user. Optionally, the central controller 170 and user interface may be an industrial computer mounted within a control cabinet and configured to withstand harsh operating environments. It is contemplated that still other combinations of computing devices and peripherals as would be understood in the art may be utilized or incorporated into the central controller 170 and user interface 176 without deviating from the scope of the invention.

The central controller 170 includes one or more programs stored in the memory device 172 for execution by the processor 174. The central controller 170 receives a desired position from the industrial controller 180 and determines one or more motion profiles for the movers 100 to follow along the track 10. A program executing on the processor 174 is in communication with each segment controller 50 on each track segment via a network medium 160. The central controller 170 may transfer a desired motion profile to each segment controller 50. Optionally, the central controller 170 may be configured to transfer the information from the industrial controller 180 identifying one or more desired movers 100 to be positioned at or moved along the track segment 12, and the segment controller 50 may determine the appropriate motion profile for each mover 100.

A position feedback system provides knowledge of the location of each mover 100 along the length of the track segment 12 to the segment controller 50. According to one embodiment of the invention, illustrated in FIGS. 2 and 4, the position feedback system includes one or more position magnets 140 mounted to the mover 100 and an array of sensors 145 spaced along the side wall 13 of the track segment 12. The sensors 145 are positioned such that each of the position magnets 140 is proximate to the sensor as the mover 100 passes each sensor 145. The sensors 145 are a suitable magnetic field detector including, for example, a Hall-Effect sensor, a magneto-diode, an anisotropic magnetoresistive (AMR) device, a giant magnetoresistive (GMR) device, a tunnel magnetoresistance (TMR) device, fluxgate sensor, or other microelectromechanical (MEMS) device configured to generate an electrical signal corresponding to the presence of a magnetic field. The magnetic field sensor 145 outputs a feedback signal provided to the segment controller 50 for the corresponding track segment 12 on which the sensor 145 is mounted. The feedback signal may be an analog signal provided to a feedback circuit 58 which, in turn, provides a signal to the processor 52 corresponding to the magnet 140 passing the sensor 145.

Figure 6:
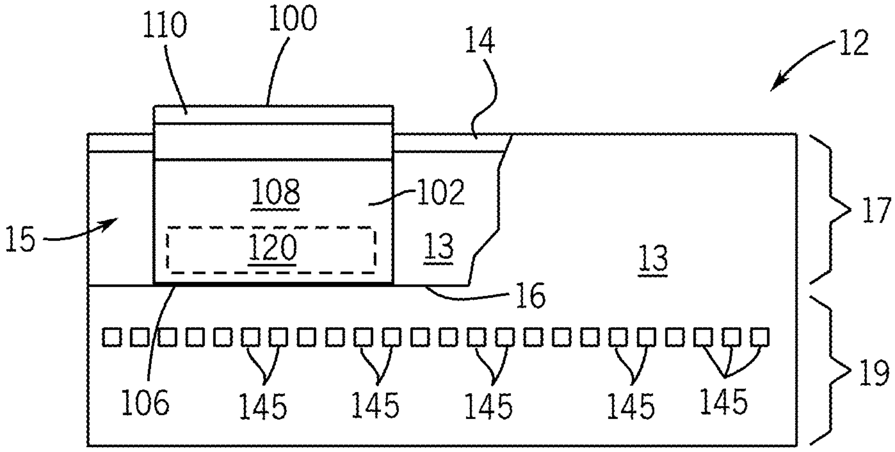
FIG. 6 is a partial side cutaway view of the mover and track segment of FIG. 5.

According to another embodiment of the invention, illustrated in FIGS. 5 and 6, the position feedback system utilizes the drive magnets 120 as position magnets. Position sensors 145 are positioned along the track segment 12 at a location suitable to detect the magnetic field generated by the drive magnets 120. According to the illustrated embodiment, the position sensors 145 are located below the coils 150. Optionally, the position sensors 145 may be interspersed with the coils 150 and located, for example, in the center of a coil or between adjacent coils. According to still another embodiment, the position sensors 145 may be positioned within the upper portion 17 of the track segment 12 and near the bottom surface 16 of the channel 15 to be aligned with the drive magnets 120 as each mover 100 travels along the tracks segment 12.

Referring again to FIG. 8, the segment controller 50 also includes a communication interface 56 that receives communications from the central controller 170 and/or from adjacent segment controllers 50. The communication interface 56 extracts data from the message packets on the industrial network and passes the data to a processor 52 executing in the segment controller 50. The processor may be a microprocessor. Optionally, the processor 52 and/or a memory device 54 within the segment controller 50 may be integrated on a field programmable gate array (FPGA) or an application specific integrated circuit (ASIC). It is contemplated that the processor 52 and memory device 54 may each be a single electronic device or formed from multiple devices. The memory device 54 may include volatile memory, non-volatile memory, or a combination thereof. At least a portion of the memory 54 is a non-transitory computer-readable storage medium. The non-transitory computer-readable storage medium is configured to store instructions for execution by the processor 52. The segment controller 50 receives the motion profile or desired motion of the movers 100 and utilizes the motion commands to control movers 100 along the track segment 12 controlled by that segment controller 50.

Each segment controller 50 generates switching signals to generate a desired current and/or voltage at each coil 150 in the track segment 12 to achieve the desired motion of the movers 100. The switching signals 72 control operation of switching devices 74 for the segment controller 50. According to the illustrated embodiment, the segment controller 50 includes a dedicated gate driver module 70 which receives command signals from the processor 52, such as a desired voltage and/or current to be generated in each coil 150, and generates the switching signals 72. Optionally, the processor 52 may incorporate the functions of the gate driver module 70 and directly generate the switching signals 72. The switching devices 74 may be a solid-state device that is activated by the switching signal, including, but not limited to, transistors, thyristors, or silicon-controlled rectifiers.

According to the illustrated embodiment, the track receives power from a distributed DC voltage. A DC bus 20 receives a DC voltage, VDC, from a DC supply and conducts the DC voltage to each track segment 12. The illustrated DC bus 20 includes two voltage rails 22, 24 across which the DC voltage is present. The DC supply may include, for example, a rectifier front end configured to receive a single or multi-phase AC voltage at an input and to convert the AC voltage to the DC voltage. It is contemplated that the rectifier section may be passive, including a diode bridge or, active, including, for example, transistors, thyristors, silicon-controlled rectifiers, or other controlled solid-state devices. Although illustrated external to the track segment 12, it is contemplated that the DC bus 20 would extend within the lower portion 19 of the track segment. Each track segment 12 includes connectors to which either the DC supply or another track segment may be connected such that the DC bus 20 may extend for the length of the track 10. Optionally, each track segment 12 may be configured to include a rectifier section (not shown) and receive an AC voltage input. The rectifier section in each track segment 12 may convert the AC voltage to a DC voltage utilized by the corresponding track segment.

The DC voltage from the DC bus 20 is provided at the input terminals 21, 23 to a power section for the segment controller. A first voltage potential is present at the first input terminal 21 and a second voltage potential is present at the second input terminal 23. The DC bus extends into the power section defining a positive rail 22 and a negative rail 24 within the segment controller. The terms positive and negative are used for reference herein and are not meant to be limiting. It is contemplated that the polarity of the DC voltage present between the input terminals 21, 23 may be negative, such that the potential on the negative rail 24 is greater than the potential on the positive rail 22. Each of the voltage rails 22, 24 are configured to conduct a DC voltage having a desired potential, according to application requirements. According to one embodiment of the invention, the positive rail 22 may have a DC voltage at a positive potential and the negative rail 24 may have a DC voltage at ground potential. Optionally, the positive rail 22 may have a DC voltage at ground potential and the negative rail 24 may have a DC voltage at a negative potential According to still another embodiment of the invention, the positive rail 22 may have a first DC voltage at a positive potential with respect to the ground potential and the negative rail 24 may have a second DC voltage at a negative potential with respect to the ground potential. The resulting DC voltage potential between the two rails 22, 24 is the difference between the potential present on the positive rail 22 and the negative rail 24.

It is further contemplated that the DC supply may include a third voltage rail 26 having a third voltage potential. According to one embodiment of the invention, the positive rail 22 has a positive voltage potential with respect to ground, the negative rail 24 has a negative voltage potential with respect to ground, and the third voltage rail 26 is maintained at a ground potential. Optionally, the negative voltage rail 24 may be at a ground potential, the positive voltage rail 22 may be at a first positive voltage potential with respect to ground, and the third voltage rail 26 may be at a second positive voltage potential with respect to ground, where the second positive voltage potential is approximately one half the magnitude of the first positive voltage potential. With such a split voltage DC bus, two of the switching devices 74 may be used in pairs to control operation of one coil 150 by alternately providing positive or negative voltages to one the coils 150.

The power section in each segment controller 50 may include multiple legs, where each leg is connected in parallel between the positive rail 22 and the negative rail 24. According to the embodiment illustrated in FIG. 8, three legs are shown arranged in a half-bridge configuration. However, the number of legs may vary and will correspond to the number of coils 150 extending along the track segment 12. Each leg includes a first switching device **74*a* and a second switching device 74*b* connected in series between the positive rail 22 and the negative rail 24 with a common connection 75 between the first and second switching devices 74*a*, 74*b*. The first switching device 74*a* in each leg may also be referred to herein as an upper switch, and the second switching device 74*b* in each leg may also be referred to herein as a lower switch. The terms upper and lower are relational only with respect to the schematic representation and are not intended to denote any particular physical relationship between the first and second switching devices 74*a*, 74*b*. The switching devices 74 include, for example, power semiconductor devices such as transistors, thyristors, and silicon-controlled rectifiers, which receive the switching signals 72 to turn on and/or off. Each of switching devices may further include a diode connected in a reverse parallel manner between the common connection 75 and either the positive or negative rail 22, 24**.

Figure 9:
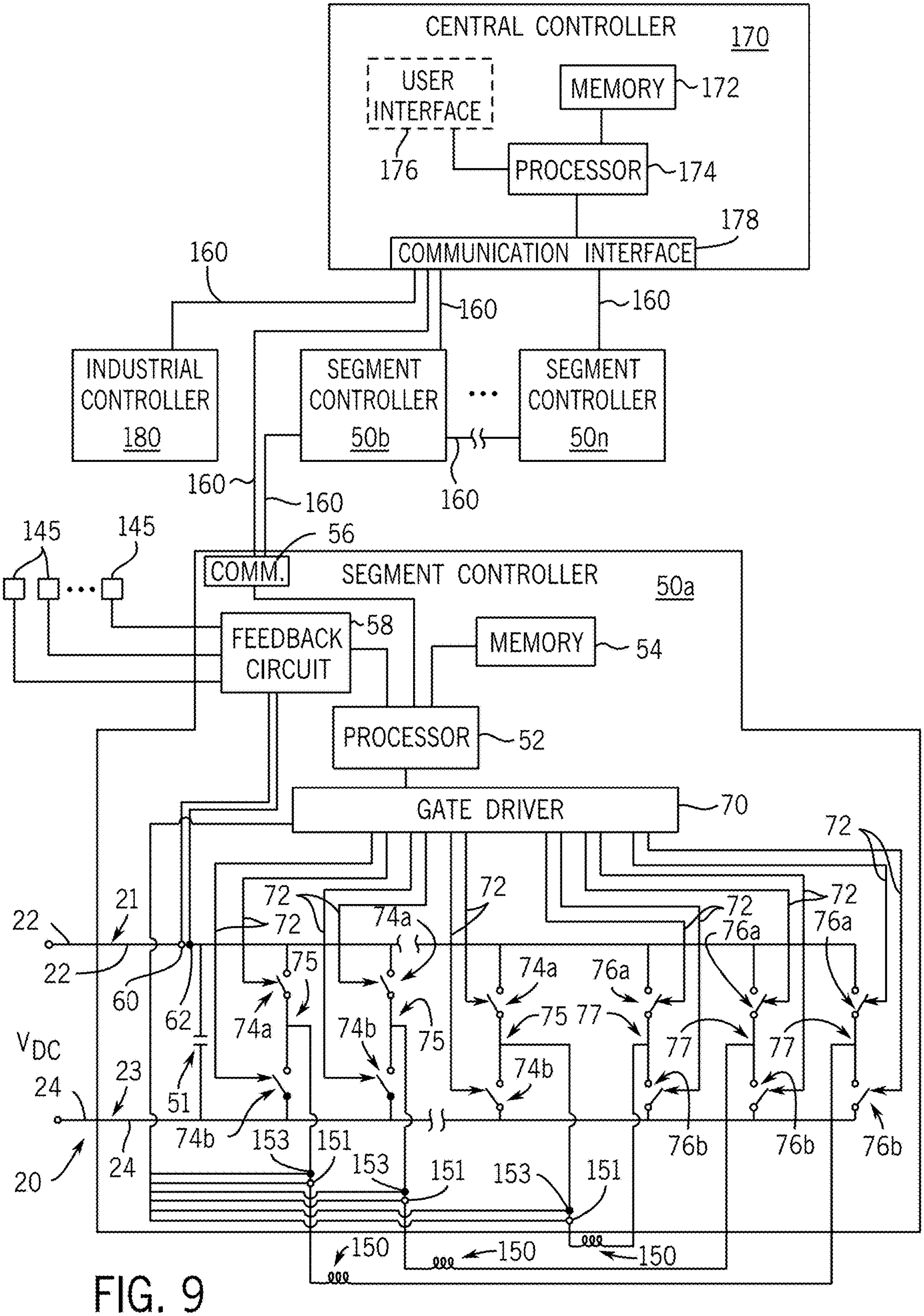
FIG. 9 is a block diagram representation of another embodiment of the exemplary control system of FIG. 1.

According to the embodiment illustrated in FIG. 9, three legs are shown arranged in a full-bridge configuration. Again, the number of legs may vary and will correspond to the number of coils 150 extending along the track segment 12. Each leg includes a first switching device **74*a* and a second switching device 74*b* connected in series on one side of the coil 150. The first and second switching devices 74*a***,

74*b* are connected between the positive rail 22 and the negative rail 24 with a first common connection 75 between the first and second switching devices 74*a*, 74*b*. The first common connection 75 is connected to the first side of the coil 150. Each leg further includes a third switching device 76*a* and a fourth switching device 76*b* connected in series on the other side of the coil 150. The third and fourth switching devices 74*a*, 74*b* are connected between the positive rail 22 and the negative rail 24 with a second common connection 77 between the first and second switching devices 74*a*, 74*b*. The second common connection 77 is connected to the second side of the coil 150. The first and third switching devices 74*a*, 76*a* in each leg may also be referred to herein as upper switches, and the second and fourth switching devices 74*b*, 76*b* in each leg may also be referred to herein as lower switches. The terms upper and lower are relational only with respect to the schematic representation and are not intended to denote any particular physical relationship between the switching devices. The switching devices 74, 76 include, for example, power semiconductor devices such as transistors, thyristors, and silicon-controlled rectifiers, which receive the switching signals 72 to turn on and/or off. Each of switching devices 74, 76 may further include a diode connected in a reverse parallel manner between the first or second common connection 75, 77 and either the positive or negative rail 22, 24.

With reference again to FIG. 8, the processor 52 may also receive feedback signals from sensors providing an indication of the operating conditions within the power segment or of the operating conditions of a coil 150 connected to the power segment. According to the illustrated embodiment, the power segment includes a voltage sensor 62 and a current sensor 60 at the input of the power segment. The voltage sensor 62 generates a voltage feedback signal and the current sensor 60 generates a current feedback signal, where each feedback signal corresponds to the operating conditions on the positive rail 22. The segment controller 50 also receives feedback signals corresponding to the operation of coils 150 connected to the power segment. A voltage sensor 153 and a current sensor 151 are connected in series with the coils 150 at each output of the power section. The voltage sensor 153 generates a voltage feedback signal and the current sensor 151 generates a current feedback signal, where each feedback signal corresponds to the operating condition of the corresponding coil 150. The processor 52 executes a program consisting of a series of instructions stored on the non-transitory memory device 54 to regulate the current and/or voltage supplied to each coil and the processor 52 and/or gate driver module 70 generates switching signals 72 which selectively enable/disable each of the switching devices 74 to achieve the desired current and/or voltage in each coil 150. With reference also to FIG. 9, it is contemplated that the feedback signals from the current sensor 151 and/or the voltage sensor 153 corresponding to the operation of the coils 150 may be provided to a dedicated current regulator device. As shown in FIG. 9, the feedback signals are provided directly to the gate driver 70 which would, in turn, regulate the current output to each coil and generate the switching signals 72 accordingly. The energized coils 150 create an electromagnetic field that interacts with the drive magnets 120 on each mover 100 to control motion of the movers 100 along the track segment 12.

Figure 10:
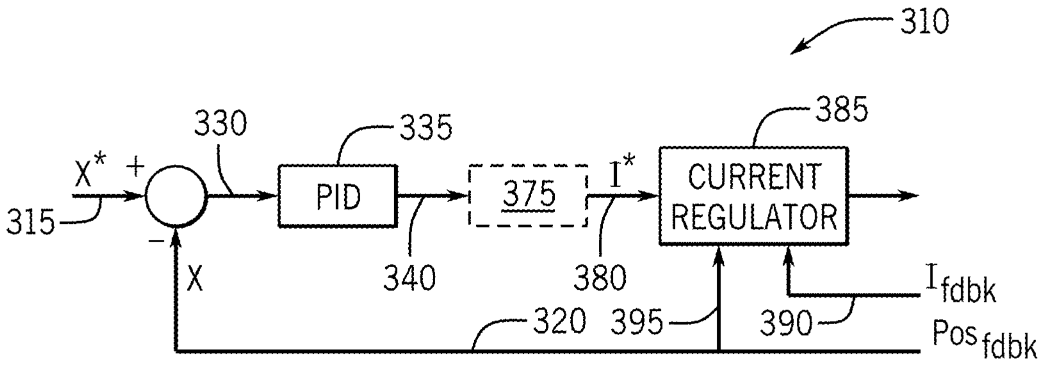
FIG. 10 is a block diagram representation of an exemplary control module executing on the control systems of FIG. 8 or 9.
Figure 11:
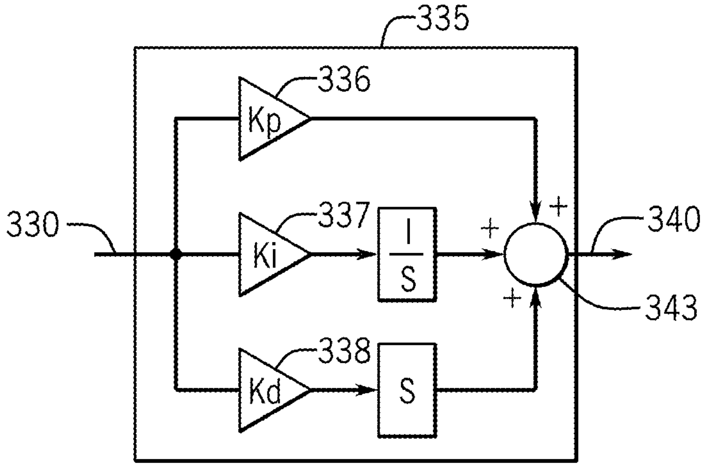
FIG. 11 is a block diagram representation of the proportional, integral, and differential regulator of FIG. 10.

In operation, each track segment 12 is configured to control operation of each mover 100 present on the track segment 12. The segment controller 50 receives a command signal corresponding to the desired operation of each mover 100 and controls the current output to each coil 150 to achieve the desired operation. With reference to FIG. 10, one implementation of a control module 310 executable by the segment controller 50 is illustrated. The control module 310 receives a position command signal, x*, 315 as an input. The position command signal, x*, is compared to a position feedback signal, x, 320 at a summing junction 325. A position error signal 330 is output from the summing junction 325 and input to control loop 335. According to FIG. 10, the illustrated control loop 335 includes a proportional, integral, and derivative (PID) regulator. With reference also to FIG. 11, each of the proportional (P), integral (I), and derivative (D) regulators of the control loop 335 includes a controller gain value. The controller gain values are commonly referred to as a proportional gain (Kp) 336, integral gain (Ki) 337, and a derivative gain (Kd) 338. The position error signal 330 is provided as an input to each controller gain. The integral regulator path includes an integrator block 341, and the derivative regulator path includes a derivative block 342. Each of the proportional, integral, and derivative regulator paths are provided to a summing junction 343 and output 340 from the position control loop 335.

The output 340 of the control loop 335 is fed to one or more additional gains and/or filters as illustrated by the optional gain and filter block 375. The gain and filter block 375 may include one or more filters to remove unwanted components from the control system. For example, a low pass filter may be provided to attenuate undesirable high frequency components and a notch filter to attenuate specific frequency components having an undesirable effect on the controlled mechanical load. The gain and filter block 375 may also include an inertial gain factor or a torque constant gain factor. An inertial gain factor converts the acceleration reference to a torque reference and the torque constant gain factor converts a torque reference to a current reference, I*, 380. Optionally, gain factors may be incorporated into a single gain or incorporated with filter or controller gains. Combining the inertial and/or torque constant gain factors together or with another controller gain or with the filter gain reduces the real time computational burden imposed on the segment controller 50.

The current reference, I*, 380 is, in turn, passed to a current regulator 385, which controls the current supplied to each coil 150 on the track segment. The current regulator 385 receives current feedback signals 390 from the current sensors 305 and an electrical angle feedback signal 395. The electrical angle 395 feedback signal may be based on the position feedback information 320 identifying the measured position of each mover 100, where an electrical angle varies between zero and three hundred sixty degrees (0-360°) for each cycle of an alternating current applied to the coils 150. The desired electrical angle 395 is a function of the position of the mover 100 and corresponds to a desired current to apply to each coil 150 to drive the mover 100 along the track. Because a mover 100 may span multiple coils 150, the current regulator 385 determines an appropriate current for each coil 150 to produce the force desired to control the mover as indicated by the current reference, I*, 380 and determines a resultant current desired for each coil 150. The current regulator 385 uses the current and electrical angle feedback information, 390 and 395, to regulate the current to each coil 150, accordingly.

The output of the current regulator 385 is provided as an input to the gate driver module 70. With reference again to FIGS. 8 and 9, the gate driver module 70 converts the input to a desired output voltage having a variable amplitude and frequency. Having determined the desired output voltage required to produce the commanded input, the gate driver module 70 generates the gating signals 72 according to pulse width modulation (PWM) or by other modulation techniques to control the switching elements 74-77 to produce the desired currents in each coil 150, resulting in the desired motion for each mover 100.

Figure 14:
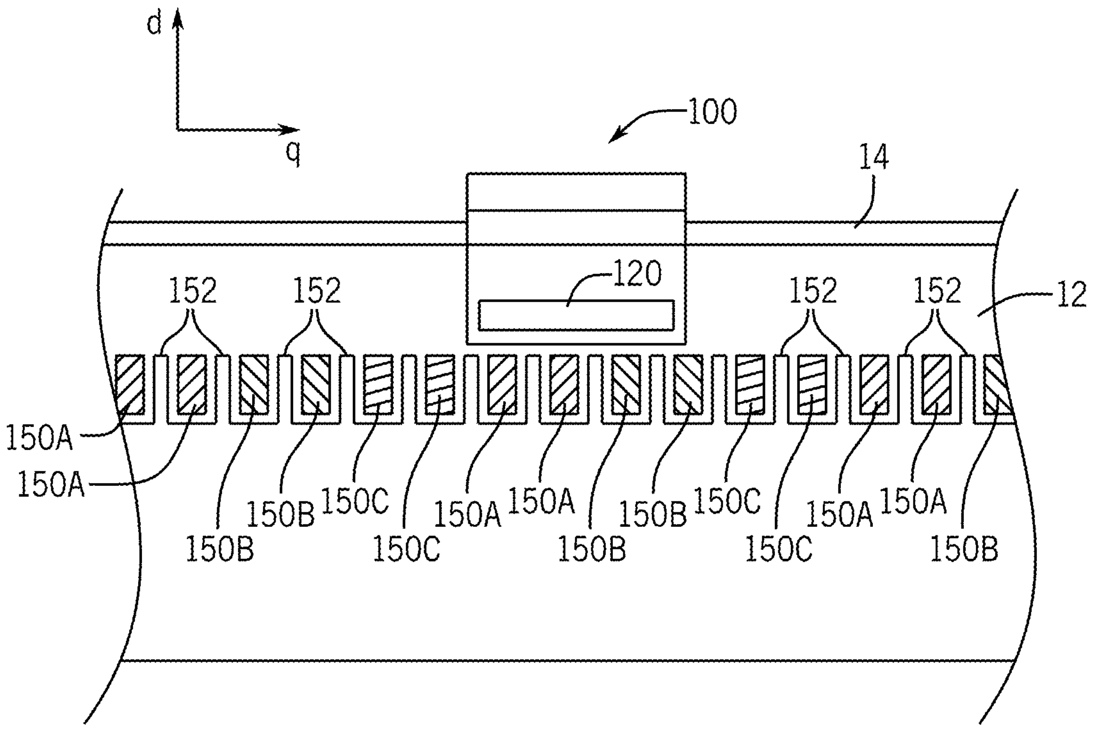
FIG. 14 is a partial side sectional view of a mover and track segment incorporating one configuration of drive coils in the track segment.
Figure 15:
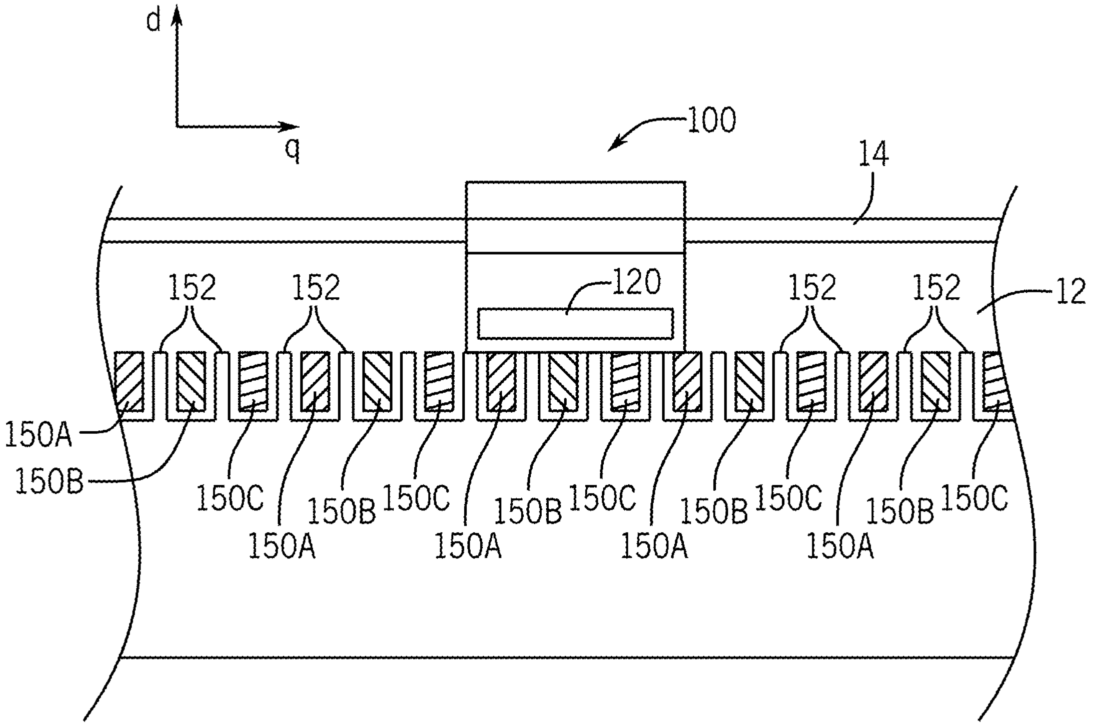
FIG. 15 is a partial side sectional view of a mover and track segment incorporating another configuration of drive coils in the track segment.

With reference next to FIGS. 14 and 15, it is contemplated that the coils 150 may be arranged in one of two configurations along the length of the track 10. In FIG. 14, the coils 150 are positioned as also illustrated in FIG. 7. Each coil 150A, 150B, 150C represents a different phase and are positioned adjacent to each other. The forward and reverse conduction paths for one coil are adjacent to each other. End turns connect the forward and reverse conduction paths defining the entire coil. It is contemplated that the lower portion 19 of the track segment 12 may include a flat surface along which coils 150 are placed in a slot-less configuration. Optionally, and as shown in FIG. 14, teeth 152 may be positioned along the length of the track segment 12 with the coils 150 positioned between the teeth for a slotted configuration.

According to still another embodiment, three coils 150 may be placed in a repeating pattern as shown in FIG. 15. The embodiment illustrated in FIG. 15 is also a slotted configuration with teeth 152 extending between each half of a coil. A first coil 150A includes a forward conduction path which is placed adjacent to a forward conduction path of a second coil 150B which is, in turn, placed adjacent to a forward conduction path of a third coil 150C. The first coil 150A then includes a return conduction path which is placed adjacent to a return conduction path of the second coil 150C which is, in turn, placed adjacent to a return conduction path of the third coil 150C. The forward and return conduction paths of each coil 150 are connected by end turns defining the entire coil 150. The embodiment illustrated in FIG. 13 corresponds to a three-phase rotary motor where the stator has been "unrolled" onto the surface of the linear drive system. Each set of three phases repeats along the length of the track in a manner similar to a multi-pole rotary motor having repeating phases around the periphery of the motor. Each set of three coils 150A, 150B, 150C corresponds to a complete electrical cycle of the alternating current applied to the coils 150.

Figure 12:
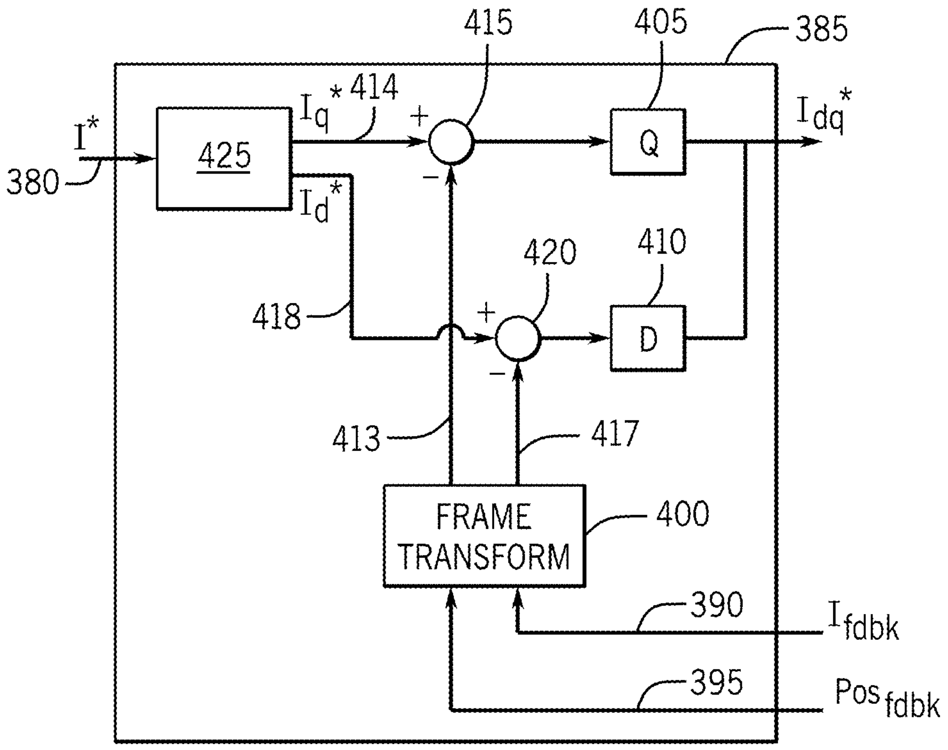
FIG. 12 is a block diagram representation of the current regulator of FIG. 10.

With reference next to FIG. 12, regulation of the current is performed in a d-q reference frame. The current feedback signal ($I_{fdbk}$) 390 is received at the controller 310 as signals corresponding to individual coils 150 of the linear drive system. The current feedback signal ($I_{fdbk}$) 390, as illustrated, includes multiple feedback signals, where each signal corresponds to an amplitude of current as measured on one coil 150 of the linear drive system. As discussed above with respect to FIGS. 8 and 9, a current sensor 151 measures the amplitude of current in each coil 150. The measured feedback signals are then provided to a reference frame transformer 400 for use by the current regulator 385. The reference frame transformer 400 is configured to transform the current feedback signals 390 from the stationary, physical reference frame in which the signals are measured to a two-phase reference frame. The reference frame transformer 400 receives the measured phase currents in the stationary reference frame ($I_{fdbk}$) and the electrical angle feedback signal 395 as inputs. The electrical angle feedback signal 395 corresponds to a desired phase angle of the current to be supplied to the coils 150 along the track segment 12. The transform between reference frames utilizes the electrical angle of the current to convert the current feedback signal from the stationary reference frame to the two-phase reference frame.

According to the illustrated embodiment, the two-phase reference frame utilized by the current regulator 385 is a d-q reference frame. When utilized with a rotary motor, the d-q reference frame is a rotating reference frame, rotating synchronously with the speed of rotation of the motor. The d-axis may be regulated to provide flux or to extend the speed range in a rotating motor, and the q-axis is regulated to provide torque in the rotating motor. In the linear drive system, the d-q reference frame similarly travels synchronously with the mover 100. As a result, the physical position feedback signal 320 may be utilized to provide an electrical angle for the reference frame transformation. For the linear drive system, the d-axis is regulated to generate an electromagnetic field that provides either an attractive force or a repelling force between the drive magnets 120 mounted on the mover 100 and the coil 150 on the track segment 12, and the q-axis is regulated to generate a force on the mover 100 in a parallel direction to the track segment 12. The d and q axes are representatively illustrated on FIGS. 14 and 15.

The reference frame transformer 400 is used to convert the measured current feedback signals to a d-q reference frame traveling with the mover 100 at a rate proportional to the fundamental frequency of the alternating current supplied to the coils 150. As shown below in Eqs. 1 and 2, the frame transformation utilizes the electrical angle feedback signal 395 and the amplitude of the currents measured in the coils 150 to generate the d and q axis current feedback signals. Equation 1 defines the current in the "d" axis, and equation 2 defines the current in the "q" axis. Both currents are present when the feedback current is referred to in the d-q axes.

$$i_{d\_fund} = \frac{2}{3}[i_a \cos\theta + i_b \cos(\theta - 120°) + i_c \cos(\theta - 240°)] \quad (1)$$

$$i_{q\_fund} = -\frac{2}{3}[i_a \sin\theta + i_b \sin(\theta - 120°) + i_c \sin(\theta - 240°)] \quad (2)$$

where:

θ=electrical angle feedback signal;

$i_a$=amplitude of current in a first coil 150A along the track segment 12;

$i_b$=amplitude of current in a second coil 150B along the track segment 12; and $i_c$=amplitude of current in a third coil 150C along the track segment 12.

The q-axis feedback signal 413 is compared to a q-axis current reference signal, $I_q$*, 414 at a q-axis summing junction 415. The d-axis feedback signal 417 is compared to a d-axis current reference signal, $I_d$*, 418 at a d-axis summing junction 420. The output of the q-axis summing junction 415 is a q-axis error signal and is provided as an input to a q-axis current regulator 405. The output of the d-axis summing junction 420 is a d-axis error signal and is provided as an input to a d-axis current regulator 410. Each of the q-axis and d-axis current regulators may include a proportional, integral, and/or derivative controller to regulate the desired current supplied to the coils 150. The output of each current regulator 410 is illustrated being combined into a single d-q current reference signal, $I_{dq}$*, to be output from the current regulator 385. This d-q current reference signal, $I_{dq}$*, may be supplied directly to the gate driver module 70 discussed above. Optionally, the d-q current reference signal, $I_{dq}$*, may first be provided to an inverse transform, which converts the reference signals back to the physical reference frame before providing the current reference signal to the gate driver module. The gate driver module 70 then generates the switching signals 72 used by pulse width modulation (PWM) or by other modulation techniques to control the switching elements 74, 76 to supply the desired current to each coil 150 along the track segment 12.

Figure 13:
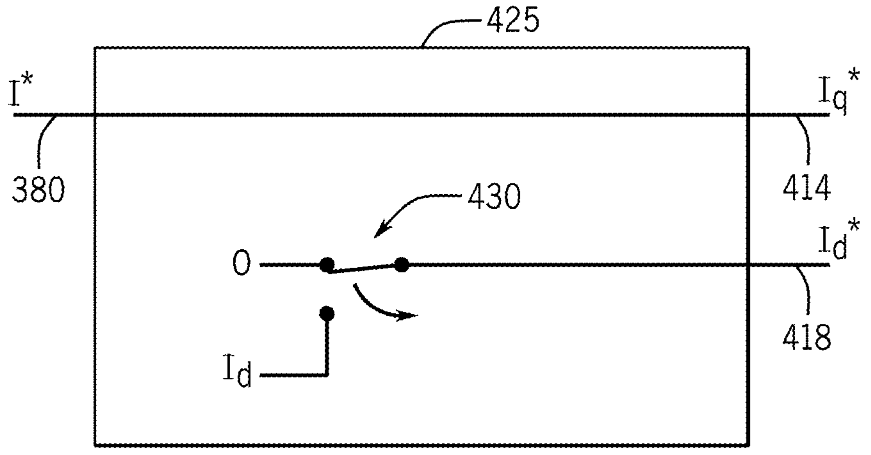
FIG. 13 is a block diagram representation of the current reference generator of FIG. 12.

With reference next to FIG. 13, the current reference signal, I*, 380 output from the first control loop 335 and/or additional gain or filter blocks 375 is used to determine the q-axis current reference signal 414 and the d-axis current reference signal 418. It is noted that the physical output of the first control loop 335 may be a desired acceleration or a desired torque reference. A gain, corresponding to a proportional constant may be provided in the additional gain or filter blocks 375 to convert the desired acceleration or desired torque reference to a current reference value. This current reference value corresponds to a current required to drive the mover 100 along the track. Because the current regulator 385 is configured to regulate current in the d-q reference frame, the current reference signal, I*, 380, which corresponds to a current required to drive the mover 100 along the track, directly corresponds to the desired q-axis current reference signal, Iq*, 414. Under normal operation, it is not desirable to have the d-axis current reference signal, Id*, 418 create either an attractive or a repelling force between the mover 100 and the track segment 12. Such a force would reduce efficiency of operation during normal travel along the track. However, during electromagnetic pinning operation, an attractive force between the mover 100 and the track segment 12 acts to resist external disturbance forces and/or noise introduced in the current feedback signal. Thus, a d-axis current, la, is supplied during electromagnetic pinning. A current reference module 425, as shown in FIG. 13, provides the current reference signal, I*, 380 directly to the desired q-axis current reference signal, $I_q$*, 414. A switch 430, which may be a series of instructions executing on the processor 52, is used to selectively provide either a zero reference value or another d-axis current reference value, $I_d$, which may be a user-definable parameter setting stored in memory 54, to the d-axis current reference signal, $I_d$*, 418.

In addition to selecting a desired current reference based on the desired operating mode, the current regulator 385 selects a desired position feedback 395 for use in the different operating modes. When traveling along the track 10, the position feedback signal 395, generated by the position sensors 145 as discussed above, is used to generate the d-q current reference signal, $I_{dq}$*. This allows the current reference signal and, more specifically, the desired q-axis current to move along the track 10, propelling the mover 100. When entering the electromagnetic pinning operation, the position feedback signal 395 is held at the desired position at which the mover 100 is to remain. In this manner, the d-axis current applied for this position becomes independent of the position feedback system and is immune to noise and/or drift in the position feedback signal. Additionally, the current generated in the coil 150 as a result of the d-axis reference signal, $I_d$*, remains unchanged in the event the mover 100 is displaced slightly as a result of an external force. If the reference frame transformer 400 used the position feedback signal 395, motion of the mover 100 due to external disturbances would cause the d-axis current to provide an attractive force at the new position rather than remaining at the desired position. Additionally, as a mover 100 is displaced from the desired position, the actual forces experienced by the mover 100 at the new position due to a current applied at the desired position become in part a restoring, q-axis, current and in part an attractive, d-axis, current. The magnitude of the restoring force increases and the magnitude of the attractive force decreases as the mover 100 moves farther from the desired position and the position feedback signal remains constant. Thus, the applied d-axis current acts as a spring force applied to the mover 100 to first hold the mover 100 in position and second to restore the mover 100 to the desired position if it becomes displaced from the desired position by an external force.

Figure 16:
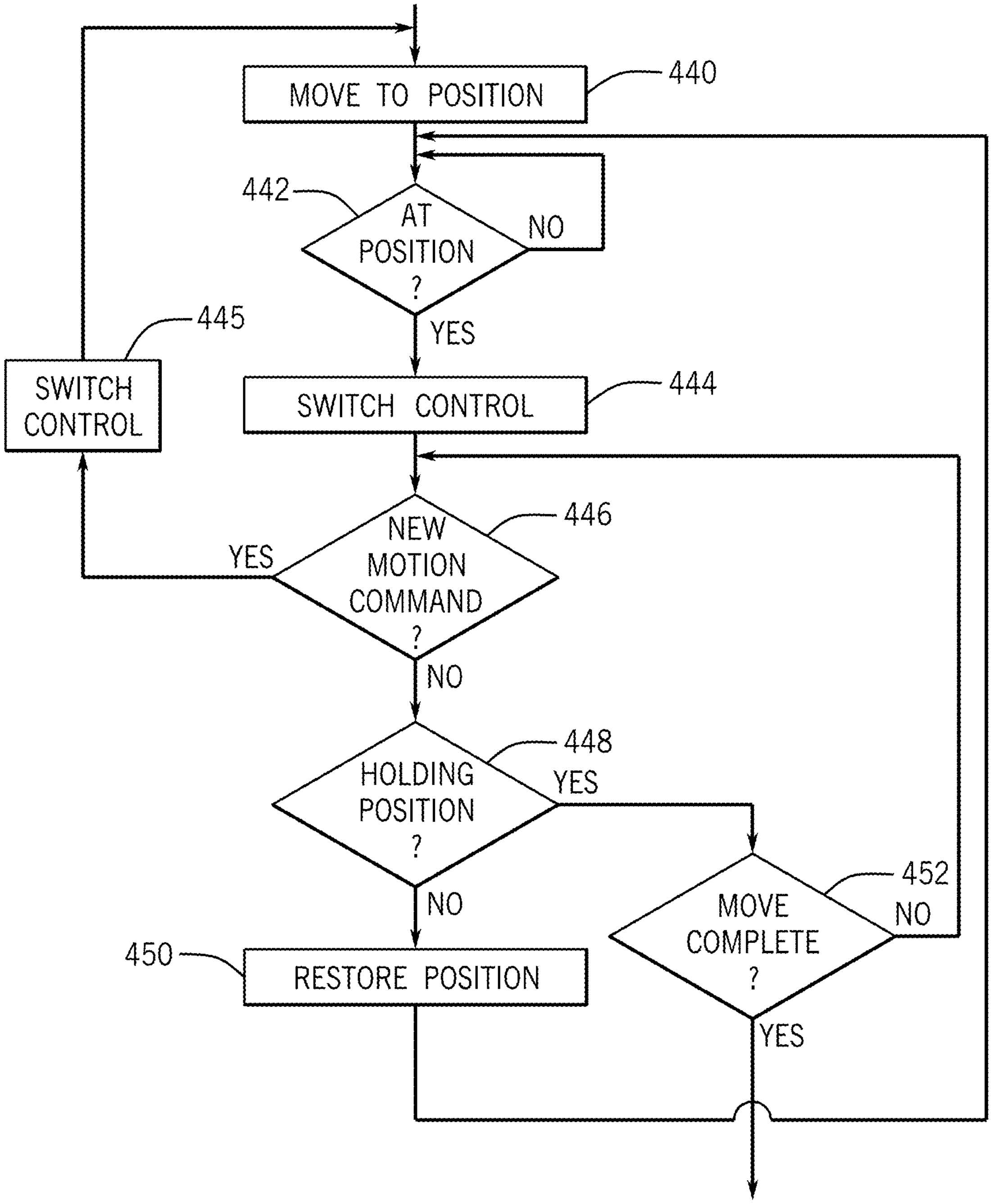
FIG. 16 is a flow diagram illustrating steps for one embodiment of electromagnetic pinning performed by the control systems of FIG. 8 or 9.
Figure 17:
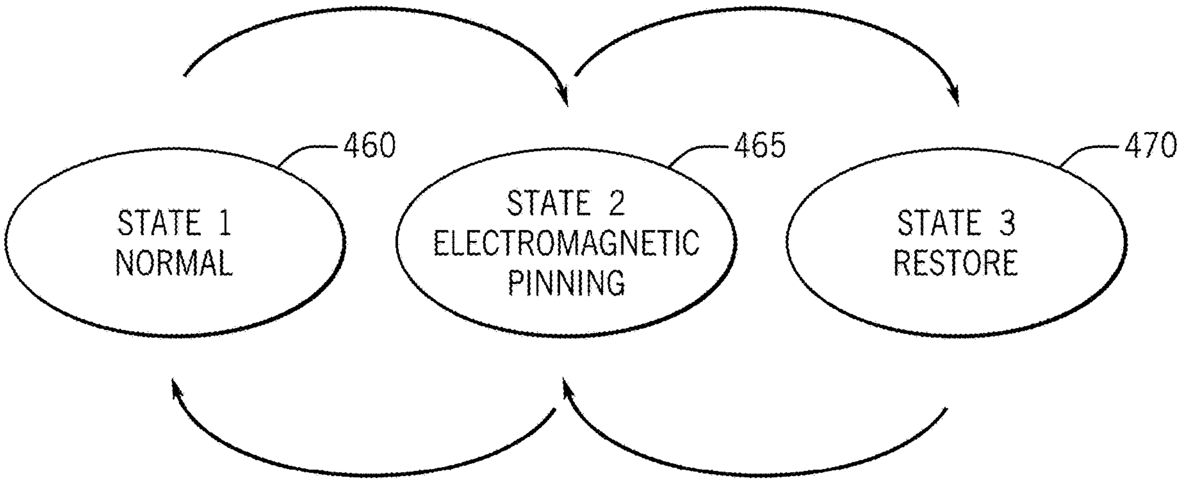
FIG. 17 is a state flow diagram illustrating different control modes utilized for one embodiment of electromagnetic pinning performed by the control systems of FIG. 8 or 9.

With reference now to FIGS. 16 and 17, operation of the electromagnetic pinning operation will be described with respect to an exemplary flow diagram (FIG. 16) and a representative state flow diagram (FIG. 17). Initially, a segment controller 50 receives a motion command for a mover 100 located on the corresponding track segment 12. The motion command may include a desired position to which the mover 100 is to be located. The segment controller 50 begins execution in the first state 460, as shown in FIG. 17, commanding the mover 100 to move to the desired position under a first operating mode. This first operating mode 460 is also referred to herein as the normal operating mode. In the first operating mode, a first set of controller gains is used by the control loop 335 and the current regulator 385 is configured to regulate the q-axis current while the d-axis current reference signal, Id*, 418 is set to zero. The segment controller 50 controls the mover 100 in this first operating mode as the mover moves to position, as shown in step 440 of FIG. 16. As shown at step 442, the segment controller 50 will continue operating in the first operating mode until the mover 100 is at position.

Once the mover 100 has reached the desired position, the segment controller 50 will switch to a second operating mode 465, as shown in step 444 of FIG. 16. With reference also to FIG. 17, the second operating mode 465 is the electromagnetic pinning operating mode. According to one aspect of the invention, the segment controller 50 may monitor operation of the mover 100 until it has reached zero speed or, in other words, has come to a complete stop at the desired position before transitioning from the first operating mode to the second operating mode. According to another aspect of the invention, the segment controller 50 may monitor the position feedback signal for the mover 100 and detect when the mover 100 is within a predefined distance from the desired position. When the mover 100 is within the predefined distance, the segment controller 50 transitions from the first operating mode 460 to the second operating mode 465.

In the second operating mode 465, the segment controller 50 is configured to execute the control loop 335, the current regulator 385, or a combination thereof according to a different control method than during the first operating mode 460. In a first aspect of the invention, the segment controller 50 may continue operating the position control loop 335 according to the same control method in the second operating mode 465 as during the first operating mode 460 while changing operation of the current regulator 385. The electromagnetic pinning is achieved by changing the switch 430 in the current reference module 425 from the first position to the second position. Additionally, the current regulator 385 may freeze the position feedback signal 395 at the desired position. Thus, while the position control loop 335 may continue operation in the same manner as during the first operating mode, the current regulator 385 begins operating in a different operating mode. Specifically, the current regulator 385 begins regulating the d-axis current reference signal, Id*, 418 to the desired level of d-axis current, $I_d$, at a desired position. This d-axis current establishes an electromagnetic force in the direction between the mover 100 and the track 12. The electromagnetic force is an attractive force between the mover 100 and the track 12 that is independent of the position feedback and that provides a spring-like force to hold the mover 100 at its present location. The transition between the first operating mode 460 and the second operating mode 465 may introduce some disturbance to the position control loop 335 or to the q-axis current regulator 405. If the segment controller 50 transitions between the first operating mode 460 and the second operating mode 465 at the predefined distance prior to the desired position, each regulator will have some time to respond to the disturbance experienced by the addition of the d-axis current. The regulators can settle out prior to reaching the desired position and then maintain their state while at the desired position.

The segment controller 50 will maintain operation in the second state 465 until a new motion command is received or the segment controller 50 detects that the controllers are not holding the desired position. A new motion command may be received, for example, when the external actuators have completed whatever task is assigned for a particular location. Because the segment controller 50 is actively holding position with electromagnetic pinning, there is no need to wait for a mechanical pin to be retracted. Rather, when the segment controller 50 is holding the mover at the desired position and a new motion command is received, the segment controller 50 switches control back to the first operating state 460, as illustrated in steps 446 and 445 of FIG. 16, and begins moving to the next desired position by repeating step 440. With the above described example of adding a d-axis current, the segment controller 50 changes the switch 430 in the current reference module 425 back to the first position from the second position, returning the d-axis current reference signal, $I_d$*, 418 from the desired level of d-axis current, la, to a zero reference. Similarly, the current regulator 385 may switch back to using the position feedback signal 395 from the position sensors 145 when transitioning back to the first operating state 460.

According to another aspect of the invention, the segment controller 50 may additionally be configured to restore the mover 100 to a desired position should the mover 100 be forced out of position while in the second operating state 465. As illustrated in step 448, the segment controller 50 monitors the present position of the mover 100. The present position of the mover 100 may be read from the position sensors 145 and compared to the desired position along the track at which the controller is to be holding the mover in the second state 465. Initially, the d-axis current applied by the electromagnetic pinning operation will provide some restoring force. If, however, the disturbance force is too great for the electromagnetic pinning and the difference between the present position and the desired position for the mover becomes greater than a threshold value, the segment controller transitions to a third operating state 470 to restore the mover 100 to the desired position, as illustrated in step 450. When the segment controller 50 has restored the mover 100 to the desired position, it reverts back to the second operating state 465. In some applications, a mover 100 may be held at a position for a time to allow interaction with an external actuator. Upon completion of the interaction, the track 10 may not yet be clear for the mover 100 to travel to the next position. The move may be indicated as complete. As shown in step 452, the segment controller 50 may be configured to exit the state routine and disable electromagnetic pinning when the move is complete. Optionally, the segment controller 50 may be configured to remain in electromagnetic pinning until the track 10 is clear and the next motion command is received.

According to an exemplary application, the application may require that the segment controller 50 arrives at the desired position within one hundred microns. A user-definable parameter stored in memory 54 may set the predefined position to two hundred microns. Thus, before the mover 100 arrives at the desired position, the segment controller 50 begins regulating the d-axis current to the d-axis current reference value, Id, when the mover 100 is two hundred microns from the desired position. The segment controller 50 applies the d-axis current and continues regulating the q-axis current to complete the move to the desired position. The mover 100 stops within the defined band of plus or minus one hundred microns around the desired position and is indicated as being at position. When the mover 100 is at the desired position, the electromagnetic pinning will hold the mover 100 within this desired band until the next motion command is received.

When arriving at a desired position, the mover 100 experiences external forces that may cause the mover 100 to move away from the desired position if the segment controller 50 simply stops supplying current to the coils 150. For example, reluctance, or cogging, forces may be present along the track due to spacing and/or slot teeth located between coils 150. The track 10 may be oriented in an incline or in a vertical orientation, subjecting the mover 100 to gravitational forces. Thus, it is preferred that the q-axis current regulator 405 maintain some output current to offset these external forces once the mover 100 has arrived at the desired position and to keep the mover 100 at the desired position.

As previously discussed, however, noise on the position feedback signal or drift in the value of the position feedback signal is provided to the position control loop 335 and may cause unexpected and undesired motion of the mover 100. While the d-axis current reference value, $I_d$, provides a resisting force against such motion, it is further contemplated that additional steps may be taken in conjunction with the addition of a d-axis current during the second operating state 465. According to one aspect of the invention, the integral regulator path is frozen during the electromagnetic pinning operating state 465. Because the integral path is intended to compensate for continuous errors, the integral path is particularly susceptible to generating current to compensate for drift or offset in the position feedback signal. By freezing the output of the integral path to the value at which it is set when the mover 100 arrives at the desired position, any drift or offset occurring in the position feedback signal while the mover 100 is located at the desired position will not cause the mover 100 to move away from the desired position. By leaving the proportional regulator active, the position control loop 335 may assist the electromagnetic pinning provided by the d-axis current regulator 410 in preventing motion from external vibrations, bumps, or other forces experienced by the mover 100.

According to another aspect of the invention, the output 340 of the position control loop 335 may be frozen during the second operating state 465. By keeping the output 340 at its last value when the mover 100 arrives at the desired position, the position control loop 335 maintains compensation for the external forces such as the reluctance, or cogging, forces and gravitational forces being exerted on the mover at the time the mover 100 arrived at the desired position. Freezing the entire regulator will also prevent the control loop 335 from attempting to compensate for noise in the position feedback in addition to preventing the control loop 335 from attempting to compensate for an offset or drift in the position feedback by just freezing the integral path. This freeze does, however, prevent the control loop 335 from providing any assistance to the d-axis current regulator 410 in preventing motion from external vibrations, bumps, or other forces experienced by the mover 100 during electromagnetic pinning operation 465.

According to still another aspect of the invention, it is contemplated that values of the control loop gains 336, 337, 338 may be modified during electromagnetic pinning operation 465. During normal operation 460 a first set of controller gains is determined to provide a highly responsive control system. The first set of controller gains are preferably configured to respond quickly to disturbances and to maintain desired operation of the mover 100 along the track. However, during electromagnetic pinning operation 465, it may be desirable to set the control loop gains 336, 337, 338 to a second set of values. The second set of control loop gains may be configured to be less responsive to external disturbances. As a result, the position control loop 335 may not generate a compensating current reference as quickly to electric noise and/or offset or drift in the position feedback signal. A reduced bandwidth response will, in particular, ignore noise on the position feedback signal and reduce vibration or other undesired motion of the mover 100 in response to said noise. Optionally, a combination of freezing one or more regulator path output values and changing controller gains in one or more of the other regulator paths may be utilized during electromagnetic pinning operation 465.

According to yet another aspect of the invention, the segment controller 50 may monitor the position feedback signal and vary control loop gains 336, 337, 338 as a function of the position feedback signal. The segment controller 50 may initially enter the electromagnetic pinning operating mode 465 according to any of the above-discussed methods. As an exemplary embodiment, the segment controller 50 may freeze the output 340 of the position control loop 335 and begin regulating a d-axis current according to the desired d-axis current reference value, $I_d$. If the mover 100 remains at the desired position or within a preset window of the desired position, no further action is required. If, however, the segment controller 50 detects some movement outside of the window of the desired position, then the segment controller 50 transitions to the third operating state 470 to restore the mover 100 to the desired position. In this third operating state 470, the segment controller 50 may set the control loop gains 336, 337, 338 to a first set of values having a lower responsiveness than the control loop gains 336, 337, 338 utilized during the normal operating state 460. The segment controller 50 continues to monitor the position feedback signal in the third operating state 470. If the difference between the present position and the desired position continues to increase, the segment controller 50 may set the control loop gains 336, 337, 338 to still another set of values. According to one aspect of the invention, the control loop gains 336, 337, 338 may be set back to the gains used during normal operation as the second step. Optionally, the control loop gains 336, 337, 338 may be incrementally changed between the first set of gains in the third operating state 470 and the set of gains use during normal operation as the position error increases. The incremental change in gains provides an increasing responsiveness in the position control loop 335 as the amount of error increases.

According to still another aspect of the invention, the segment controller 50 may be required to use a first threshold for determining when the mover 100 has arrived at the desired position and a second threshold for determining when the mover 100 is remaining at the desired position. As in the example discussed above, a mover 100 may need to arrive at a desired position within plus or minus one hundred microns. Once the mover 100 has come to a stop within that window, a new requirement may be imposed that the mover 100 remain at its current position within plus or minus ten microns. A first threshold is used to determine at position and transition between the first operating state 460 and the second operating state 465, and a second threshold is used during the second operating state 465 to transition to the third operating state 470 and restore a desired position if needed.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method for holding position of a mover in an independent cart system, the method comprising the steps of:

receiving a current feedback signal at a controller for the independent cart system in a physical reference frame, the current feedback signal corresponding to a current present in at least one coil for a linear drive system in the independent cart system;

regulating a desired current for the at least one coil with a current regulator in a first operating mode with the controller to drive at least one mover to a desired position along a track in the independent cart system, wherein regulating the desired current in the first operating mode includes executing an integral regulator path in the current regulator to continually adapt the desired current as the at least one mover is driven to the desired position; and regulating the desired current for the at least one coil with the current regulator in a second operating mode with the controller to hold the at least one mover at the desired position along the track in the independent cart system, wherein regulating the desired current in the second operating mode includes executing the integral regulator path in the current regulator to maintain a constant value from the integral regulator path when the at least one mover is at the desired position.

2. The method of claim 1, wherein regulating the desired current in the second operating mode includes freezing an output of the integral regulator.

3. The method of claim 1, wherein regulating the desired current in the second operating mode includes disabling an output of the integral regulator.

4. The method of claim 1, further comprising the step of receiving a position feedback signal at the controller corresponding to a present position of the at least one mover along the track, wherein:

regulating the desired current for the at least one coil in the first operating mode further comprises regulating the desired current as a function of the position feedback signal; and regulating the desired current for the at least one coil in the second operating mode further comprises regulating the current as a function of the desired position.

5. The method of claim 1, further comprising the steps of:

receiving a position feedback signal at the controller corresponding to a present position of the at least one mover along the track;

comparing the present position of the at least one mover to the desired position; and when a difference between the present position and the desired position of the at least one mover is less than a first threshold, begin regulating the desired current with the current regulator in the second operating mode while continuing to drive the at least one mover to the desired position.

6. The method of claim 1, further comprising the steps of:

receiving a position feedback signal at the controller corresponding to a present position of the at least one mover along the track;

comparing the present position of the at least one mover to the desired position while regulating the desired current present in the at least one coil in the second operating mode; and when a difference between the present position and the desired position of the at least one mover is greater than a predefined threshold, regulating the desired current for the at least one coil with the current regulator in a third operating mode to drive the at least one mover back to the desired position along the track.

7. The method of claim 1, further comprising the step of:

transforming the current feedback signal from the physical reference frame to a two-phase reference frame, wherein:

a first phase of the two-phase reference frame corresponds to current providing a driving force along the track to the at least one mover;

a second phase of the two-phase reference frame corresponds to current providing an attractive force between the at least one coil and the at least one mover;

regulating the desired current in the first operating mode further comprises the steps of:

regulating the desired current in the first phase to drive the at least one mover to the desired position, and regulating the desired current in the second phase to a first level; and regulating the desired current in the second operating mode further comprises the steps of:

regulating the desired current in the first phase to hold the at least one mover at the desired position, and regulating the desired current in the second phase to a second level, the second level greater than the first level.

8. The method of claim 7, wherein executing the integral regulator path in the current regulator to maintain a constant value when the at least one mover is at the desired position comprises executing the integral regulator path for the first phase to maintain a constant value.

9. The method of claim 7, wherein regulating the desired current for the first phase during the first operating mode utilizes a first set of controller gains and regulating the desired current for the first phase during the second operating mode utilizes a second set of controller gains, the second set of controller gains being less responsive to a change in the current feedback signal than the first set of controller gains.

10. The method of claim 7, wherein:

regulating the desired current in the first phase to drive the at least one mover to the desired position further includes executing at least one of a proportional regulator, an integral regulator, and a derivative regulator, and regulating the desired current in the first phase to hold the at least one mover at the desired position includes freezing or disabling an output of each of the proportional regulator, the integral regulator, and the derivative regulator.

11. A system for holding position of a mover in an independent cart system, the system comprising:

a track including a first drive member of a linear drive system;

at least one mover including a second drive member of the linear drive system, wherein the first drive member and the second drive member operatively engage each other to drive the at least one mover along the track; and a controller configured to execute a series of instructions to:

regulate a desired current for the first drive member in a first operating mode to drive the at least one mover to a desired position along the track, wherein regulating the desired current in the first operating mode includes executing an integral regulator path in a current regulator to continually adapt the desired current as the at least one mover is driven to the desired position; and regulate the desired current for the first drive member in a second operating mode to hold the at least one mover at the desired position along the track, wherein regulating the desired current in the second operating mode includes executing the integral regulator path in the current regulator to maintain a constant value from the integral regulator path when the at least one mover is at the desired position.

12. The system of claim 11, wherein regulating the desired current in the second operating mode includes freezing an output of the integral regulator.

13. The system of claim 11, wherein regulating the desired current in the second operating mode includes disabling an output of the integral regulator.

14. The system of claim 11, further comprising:

a position feedback system configured to generate a position feedback signal corresponding to a present position of the at least one mover along the track, wherein the controller is further configured to execute the series of instructions to:

regulate the desired current for the first drive member in the first operating mode as a function of the position feedback signal; and regulate the desired current for the first drive member in the second operating mode as a function of the desired position.

15. The system of claim 14, wherein the controller is further configured to execute the series of instructions to:

compare the present position of the at least one mover to the desired position while regulating the desired current for the first drive member in the second operating mode; and when a difference between the present position and the desired position of the at least one mover is greater than a predefined threshold, regulate the desired current in a third operating mode to drive the at least one mover back to the desired position along the track.

16. A non-transitory computer-readable storage medium storing instructions for execution by a processor that, when executed, comprise the steps of:

receiving a current feedback signal corresponding to a current present in at least one coil for a linear drive system in an independent cart system;

receiving a motion command for at least one mover to travel to a desired position along a track of the independent cart system;

regulating a desired current for the at least one coil with a current regulator in a first operating mode to drive at least one mover to the desired position, wherein regulating the desired current in the first operating mode includes executing an integral regulator path in the current regulator to continually adapt the desired current as the at least one mover is driven to the desired position; and regulating the desired current for the at least one coil with the current regulator in a second operating mode to hold the at least one mover at the desired position, wherein regulating the desired current in the second operating mode includes executing the integral regulator path in the current regulator to maintain a constant value from the integral regulator path when the at least one mover is at the desired position.

17. The non-transitory computer-readable storage medium of claim 16, wherein regulating the desired current in the second operating mode includes freezing an output of the integral regulator.

18. The non-transitory computer-readable storage medium of claim 16, wherein regulating the desired current in the second operating mode includes disabling an output of the integral regulator.

19. The non-transitory computer-readable storage medium of claim 16, further comprising the step of receiving a position feedback signal corresponding to a present position of the at least one mover along the track, wherein:

regulating the desired current for the at least one coil in the first operating mode further comprises regulating the desired current as a function of the position feedback signal; and regulating the desired current for the at least one coil in the second operating mode further comprises regulating the current as a function of the desired position.

20. The non-transitory computer-readable storage medium of claim 19, further comprising the steps of:

receiving a position feedback signal corresponding to a present position of the at least one mover along the track;

comparing the present position of the at least one mover to the desired position while regulating the desired current present in the at least one coil in the second operating mode; and when a difference between the present position and the desired position of the at least one mover is greater than a predefined threshold, regulating the desired current for the at least one coil with the current regulator in a third operating mode to drive the at least one mover back to the desired position along the track.

* * * * *